United States Patent
Porch et al.

(10) Patent No.: US 12,325,070 B2
(45) Date of Patent: Jun. 10, 2025

(54) METAL POWDER BED ADDITIVE MANUFACTURING APPARATUS AND METHODS

(71) Applicant: RENISHAW PLC, Wotton-under-Edge (GB)

(72) Inventors: Adrian Porch, Pontypridd (GB); Steven Cripps, Taunton (GB); Nyle Parker, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 604 days.

(21) Appl. No.: 17/615,507

(22) PCT Filed: May 28, 2020

(86) PCT No.: PCT/GB2020/051283
§ 371 (c)(1),
(2) Date: Nov. 30, 2021

(87) PCT Pub. No.: WO2020/240180
PCT Pub. Date: Dec. 3, 2020

(65) Prior Publication Data
US 2022/0305560 A1    Sep. 29, 2022

(30) Foreign Application Priority Data
May 31, 2019   (GB) ...................... 1907714

(51) Int. Cl.
*B22F 12/30*    (2021.01)
*B22F 10/28*    (2021.01)
(Continued)

(52) U.S. Cl.
CPC .............. *B22F 12/30* (2021.01); *B22F 10/28* (2021.01); *B22F 10/30* (2021.01); *B22F 10/366* (2021.01);
(Continued)

(58) Field of Classification Search
CPC .......... B22F 12/10; B22F 12/30; B22F 12/38; B22F 12/49; B22F 12/52; B22F 12/90;
(Continued)

(56) References Cited

U.S. PATENT DOCUMENTS

| 5,753,274 A | 5/1998 | Wilkening et al. |
| 6,042,774 A | 3/2000 | Wilkening et al. |

(Continued)

FOREIGN PATENT DOCUMENTS

| CN | 107000321 A | 8/2017 |
| CN | 108161003 A | 6/2018 |

(Continued)

OTHER PUBLICATIONS

Jun. 29, 2020 International Search Report issued in International Patent Application No. PCT/GB2020/051283.

(Continued)

*Primary Examiner* — Moshe Wilensky
(74) *Attorney, Agent, or Firm* — Oliff PLC

(57) ABSTRACT

A powder bed fusion apparatus includes a build platform movable in a build sleeve, the build platform for supporting a bed of metal powder, a powder layer formation device for forming layers of metal powder to form the bed, a scanner for directing an energy beam to selected regions of each layer to consolidate the metal powder and a radio-wave generator arranged to surround the metal powder and generate radio waves to heat the metal powder that forms the bed.

12 Claims, 7 Drawing Sheets

(51) Int. Cl.
| | |
|---|---|
| *B22F 10/30* | (2021.01) |
| *B22F 10/366* | (2021.01) |
| *B22F 12/00* | (2021.01) |
| *B22F 12/10* | (2021.01) |
| *B22F 12/49* | (2021.01) |
| *B22F 12/52* | (2021.01) |
| *B22F 12/90* | (2021.01) |
| *B33Y 10/00* | (2015.01) |
| *B33Y 30/00* | (2015.01) |
| *H05B 6/50* | (2006.01) |
| *H05B 6/62* | (2006.01) |
| *B22F 10/32* | (2021.01) |

(52) U.S. Cl.
CPC ............ *B22F 12/10* (2021.01); *B22F 12/222* (2021.01); *B22F 12/38* (2021.01); *B22F 12/49* (2021.01); *B22F 12/52* (2021.01); *B22F 12/90* (2021.01); *B33Y 10/00* (2014.12); *B33Y 30/00* (2014.12); *H05B 6/50* (2013.01); *H05B 6/62* (2013.01); *B22F 10/32* (2021.01)

(58) Field of Classification Search
CPC ........ B22F 12/222; B22F 10/28; B22F 10/30; B22F 10/32; B22F 10/366; B22F 2999/00; B33Y 10/00; B33Y 30/00; H05B 6/50; H05B 6/62
See application file for complete search history.

(56) References Cited

U.S. PATENT DOCUMENTS

| | | | |
|---|---|---|---|
| 6,215,093 | B1 | 4/2001 | Meiners et al. |
| 6,672,343 | B1 | 1/2004 | Perret et al. |
| 9,616,458 | B2 | 4/2017 | Flesch et al. |
| 10,933,620 | B2 | 3/2021 | Sutcliffe et al. |
| 2009/0045191 | A1 | 2/2009 | Ben-Shmuel et al. |
| 2011/0223349 | A1 | 9/2011 | Scott |
| 2013/0309420 | A1 | 11/2013 | Flesch et al. |
| 2014/0348969 | A1 | 11/2014 | Scott |
| 2017/0304895 | A1 | 10/2017 | Porch et al. |
| 2018/0244034 | A1 | 8/2018 | Sutcliffe et al. |
| 2018/0326485 | A1 | 11/2018 | Brown |
| 2020/0061922 | A1 | 2/2020 | Meiners et al. |
| 2021/0308805 | A1 | 10/2021 | Ma et al. |

FOREIGN PATENT DOCUMENTS

| | | |
|---|---|---|
| CN | 108161008 A | 6/2018 |
| CN | 108687347 A | 10/2018 |
| CN | 109663917 A | 4/2019 |
| DE | 102015002967 A1 | 10/2016 |
| EP | 3395481 A1 | 10/2018 |
| WO | 2010/007396 A1 | 1/2010 |
| WO | 2016/051163 A1 | 4/2016 |
| WO | 2016/079494 A2 | 5/2016 |
| WO | 2017/085470 A1 | 5/2017 |
| WO | 2018/017079 A1 | 1/2018 |
| WO | 2018/189701 A1 | 10/2018 |
| WO | 2018/200515 A1 | 11/2018 |

OTHER PUBLICATIONS

Jun. 29, 2020 Written Opinion issued in International Patent Application No. PCT/GB2020/051283.

A novel VHF Heating System to aid Selective Laser Melting (4 pages).

Frazier WE—Metal Additive Manufacturing: A Review, Journal of Materials Engineering & Performance, vol. 23, pp. 1917-1928, Apr. 2014.

Peverini OA et al—Additive manufacturing of Ku/K-band waveguide filters: a comparative analysis among selective-laser melting and stereolithography. IET Microwaves, Antennas and Propagation, vol. 11, pp. 1936-1942, Nov. 2017.

Booth P & Lluch EV—Enhancing the Performance of Waveguide Filters using Additive Manufacturing, Proceedings of the IEEE, vol. 105, pp. 613-619, Apr. 2017.

Chieh JS et al—Development of a Ku-Band corrugated conical horn using 3-D print technology, IEEE Antennas and Wireless Propagation Letters, vol. 13, pp. 201-204, Jan. 2014.

Buchelnikov VD et al—Heating of metallic powders by microwaves: Experiment and theory, Journal of Applied Physics, vol. 104, Article No. 113505, Dec. 2008.

Hergt R, Dutz S et al—Magnetic particle hyperthermia: nanoparticle magnetism and materials development for cancer therapy, Journal of Physics: Condenses matter, vol. 18, pp. S2919-S2934, Sep. 2006.

Porch A, Slocombe D & Edwards PP—Microwave absorption in powders of small conducting particles for heating applications, Phys. Chem. Chem. Phys. vol. 15, pp. 2757-2763, 2013.

Hefford S, Parker, N, Lees J & Porch A—Monitoring changes in Microwave Absorption of Ti64 Powder during Microwave Sintering, Proceedings of the 47th European Microwave Conference (EuMC), Nuremberg, Germany, Oct. 10-12, 2017, pp. 927-929.

Clark N, Jones N & Porch A—Measurement of average particle size in metal powders by microwave cavity perturbation in the magnetic field, Sensors & Actuators A, vol. 259, pp. 137-143, Jun. 2017.

Kurlov AS & Gusev AI—Oxidation of tungsten carbide powders in air, International Journal of Refractory Metals and Hard Materials, vol. 41, pp. 300-307, Nov. 2013.

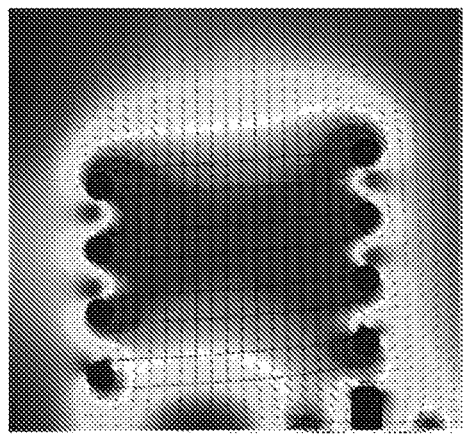
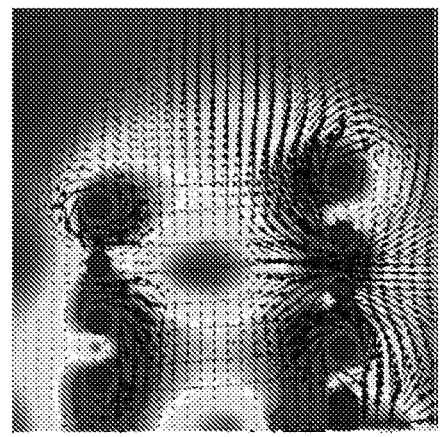
FIG. 6a          FIG. 6b
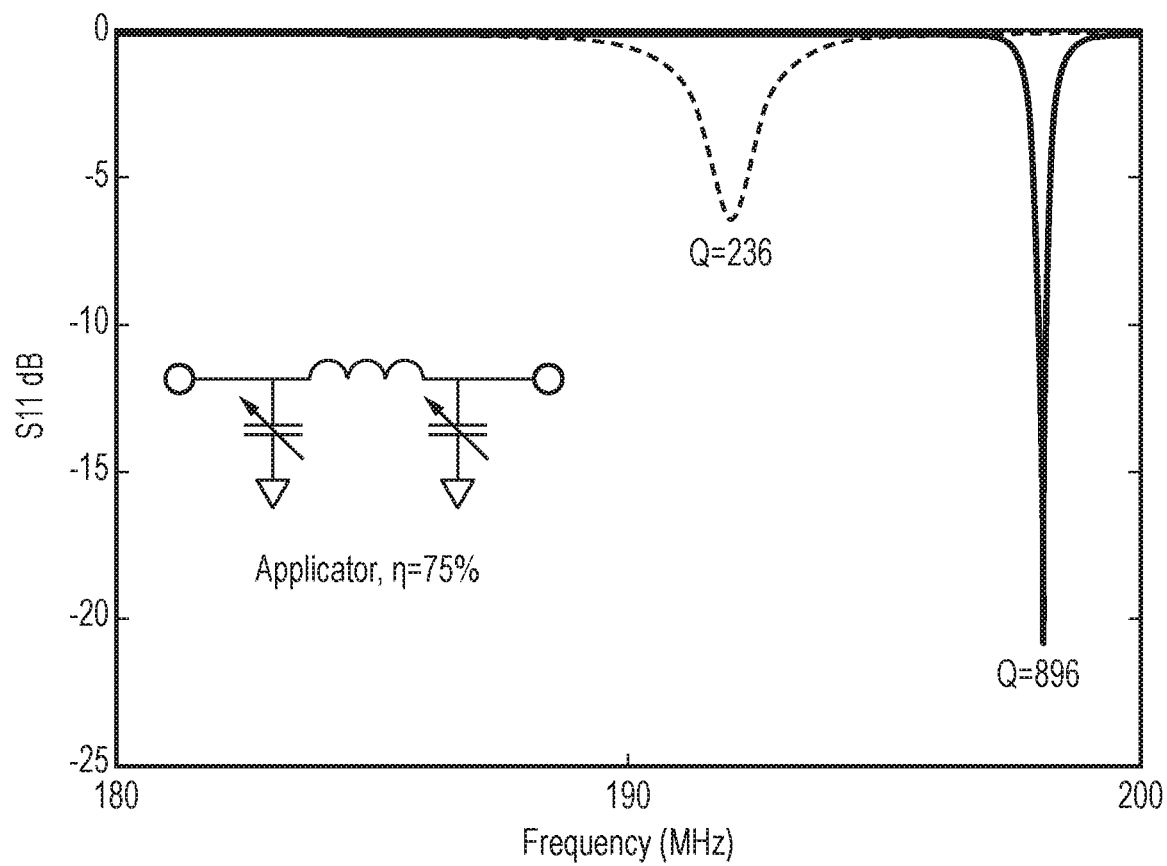
FIG. 7

METAL POWDER BED ADDITIVE MANUFACTURING APPARATUS AND METHODS

FIELD OF INVENTION

This invention concerns a metal powder bed additive manufacturing apparatus and method. The invention has particular application to the heating of metal powder in a powder bed additive manufacturing apparatus using radio frequency heating.

BACKGROUND

Powder bed fusion apparatus, such as selective laser melting (SLM) apparatus, produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across areas of the powder layer that correspond to a cross-section of the object being constructed. The laser beam melts the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

During the build, forces produced as the solidified material contracts during cooling can result in distortion of the part, such as curling of the part upwards. It is known to build supports as part of the build for holding the part in place. However, such supports can be difficult to remove at the end of the build. Furthermore, residual stresses in the part can cause the part to distort when the part is released from the supports.

When melting/sintering the powder material it is desirable to bring the powder to the sintering/melting temperature whilst vaporising as little of the material as possible. However, heating of the powder layer with the laser produces a decreasing temperature gradient throughout the layer thickness. Accordingly, to melt powder throughout the layer thickness may require upper parts of the layer to reach a temperature significantly above the sintering/melting temperature, potentially resulting in vaporisation (potentially, explosive vaporisation) of the powder. Vaporisation and, in particular, explosive vaporisation, can result in the formation of voids in the part. Furthermore, defects may be formed in the part from vaporised material solidifying at undesirable locations on the powder bed during part formation.

Furthermore, rapid solidification of molten material can result in solidification cracking of the material.

It is known to reduce the temperature gradients generated by the laser during part formation by heating the entire powder bed to a temperature close to the melting or sintering temperature before melting or sintering the powder with the laser.

U.S. Pat. No. 9,616,458 B2 discloses a selective laser melting apparatus comprising an inductive heater for heating powder in a zone of the powder bed.

WO2016/051163 discloses an additive manufacturing apparatus comprising a microwave or radio wave source controllable to generate a microwave or radio wave field to differentially heat the material bed.

SUMMARY OF INVENTION

According to a first aspect of the invention a powder bed fusion apparatus comprising a build platform movable in a build sleeve, the build platform for supporting a bed of metal powder, a powder layer formation device for forming layers of metal powder to form the bed, a scanner for directing an energy beam to selected regions of each layer to consolidate the metal powder and a radio-wave generator arranged to generate radio waves to heat the metal powder.

The radio wave generator may be arranged to generate frequencies between 30 MHz to 500 MHz, more preferably between 100 MHz to 500 MHz and most preferably 100 MHz to 300 MHz. It is believed that this range of frequencies is optimal for heating of particles of the sizes used in powder bed fusion (e.g. 10-40 μm). Even though the skin depth is still small (of the order of the particle size), large volumes of powder can be almost fully penetrated (so heated) by the radio frequency (RF) magnetic field, as each particle behaves independently, rather than collectively. In this way a moderate power radio wave generator can be used, such as a radio wave generator delivering 100 W or less.

The direct heating of dense, large volumetric (bulk) metal structures by radio waves having a frequency of 30 MHz to 500 MHz is not effective due to the high conductivity of the metal surface and a skin depth that is much smaller than the sample size, leading to ineffective penetration of the RF magnetic field. This is not the case with metal powder with significant inter-particle volume. Such metal powder should be treated, at least from an electrical standpoint, as artificial dielectrics—a composite of the metal powder and gas/vacuum. In a powder the metal particles are separated by dielectric regions comprised of air, inert gas, or vacuum, and, frequently, a thin oxide coating. These features significantly modify the interaction from the pure metal case. The predominant interaction is eddy currents induced on or near the particle surface. These currents can produce strong coupling to the radio wave fields resulting in efficient, localized heat generation—so called radio frequency heating. Ohmic currents between the particles may also be generated directly by the RF electric field, if a coating, such as an oxide layer, on the particles is weakly conducting, producing "dielectric heating". As the radio wave field is ineffective at heating large volumetric metal structures, such as metal walls of a build chamber, the metal powder is "selectively" heated to high temperatures whilst unwanted heating of the large volumetric metal structures, such as the build chamber walls, is avoided.

RF and dielectric heating is to be contrasted with inductive heating, in which a low frequency (of the order of kHz) alternating magnetic field induces eddy currents in an electrically conducting object. The eddy currents flow through the resistance of the material to heat the material by Joule heating. Such inductive heating is ineffective at heating metal powders.

The apparatus may comprise a radio wave resonator arranged to surround the metal powder and the radio wave generator is arranged to generate radio waves at a resonant frequency of the radio wave resonator to heat the metal powder that forms the bed.

By heating the powder within a radio wave resonator, a medium to low power radio waves generator may be used to heat the powder to a required temperature, such as above 400° C.

The radio wave generator may be arranged to generate radio waves at a resonant frequency of the radio wave resonator when containing a bed of metal powder. The radio wave generator may comprise a controller for altering the frequency of the generated radio waves to match the resonant frequency to the powder of the bed and the radio wave resonator. The controller may control a signal generator to set the frequency of the generated radio waves in response to a user input, for example of a type of powder used to form the bed, and/or in response to a signal generated by a sensor, such as a signal analyser or a temperature sensor monitoring a temperature of the bed. The controller may be arranged to control the signal generator to sweep the frequency of the radio waves across a range of frequencies to identify and/or track the resonant frequency. For example, the resonant frequency of the radio wave resonator may change as the build platform is lowered and/or more powder is added to the bed. Accordingly, the controller may be arranged to track the resonant frequency with changes within a volume surrounded by the radio-wave resonator as the build progresses. The sensor may measure a difference between forward and reflected power for the radio-wave resonator. The controller may control the signal generator to switch between high and low power states and adjust a frequency of the radio-waves based upon signals from the sensor generated during the low power state. In the low power state, a frequency of the radio waves may be swept across a range of frequencies to identify a resonant frequency. The controller may be arranged to select a frequency of the radio waves at which a peak loss is achieved between the forward and reflected power.

The radio wave generator may be arranged to produce pulsed radio wave power. The controller may control the radio wave generator to vary a pulse width, for example based upon an amount to powder in the powder bed and/or in response to the sensor. The pulse width may be varied to control a temperature and temperature rise of the powder.

The radio wave generator may comprise an impendence matching circuit. The controller may be arranged to control the impedance matching circuit based upon signals from a sensor, such as sensor measuring forward and reflected power for the radio-wave resonator. In this way, the radio-wave generator may track the impedance of the system as the load changes, for example due to the laying of further powder layers and/or the solidification of powder by an energy beam (creating solid matter that is not effectively heated by e radio waves).

The radio-wave generator and/or resonator may be arranged to surround at least a portion of the bed such that the metal powder is heated when part of the bed. This may be advantageous as the powder is heated in situ. Alternatively or additionally, the radio-wave generator and/or resonator may be arranged to surround powder that has yet to be formed in to layers of the bed. For example, the layer formation device may comprise a recoating device for spreading powder in layers across the bed and the radio wave generator and/or resonator may be arranged to surround powder when contained within a recoating device. Such a recoating device may comprise two upstanding walls that define a cavity therebetween, an example of which is disclosed in U.S. Pat. No. 6,672,343, and the radio-wave generator and/or resonator may be arranged to surround powder contained in the cavity of the recoater. The layer formation device may comprise a dosing mechanism for transferring a dose of powder from a powder hopper to a processing plate from where the dose of powder is spread by a recoater and the radio wave generator and/or resonator may be arranged to surround powder when contained within the dosing mechanism. The dosing mechanism may comprise a metering member sandwiched between first and second retaining plates and movable relative thereto, the metering member comprising one or more metering voids that extend through the metering member with entrance openings defined in a first face of the metering member and exit openings defined in a second face of the metering member, wherein relative movement of the metering member moves the voids from a position in which the entrance opening can receive powder from a powder hopper to a position in which powder contained in the metering void can exit from the void via the exit opening. An example of such a metering member is described in WO2010/007396. The radio wave generator and/or resonator may be arranged to surround powder when contained within the or each metering void. In this way, the radio-wave generator and/or resonator may preheat the powder before it is spread into layers of the bed.

The radio-wave generator may comprise a radio-wave cavity containing the powder. Walls of the radio-wave cavity may be formed by walls of a build chamber, the build sleeve and build platform. The build chamber may be arranged to maintain an inert atmosphere surrounding an upper surface of the bed of powder, an upper surface of the build platform. The build chamber, build sleeve and/or build platform may be formed of an austenitic steel. Walls of the radio-wave cavity may be formed by walls of a powder hopper of the powder layer formation device. Walls of the radio-wave cavity may comprise walls of a recoater for spreading powder in layers across the bed. Walls of the radio-wave cavity may comprise walls of a metering member that define the one or more metering voids The radio-wave generator may further comprise a radio-wave source for generating the radio-waves that extends into the radio-wave cavity. For example, the signal generator may be coupled into the radio-wave cavity by a wire probe, loop and/or coaxial cable. A conductive structure located within a build chamber having a secondary function may form part of the coupling structure. The conductive structure may direct gas flow through the build chamber.

The radio wave generator may comprise a coil connected to a source of alternating current and optionally, radio wave shielding, such as a metal cage, surrounding the coil to increase the Q factor of the radio wave resonator. The coil may surround or be embedded in the build sleeve. The coil surrounding or embedded in the build sleeve may be arranged to surround only a set number of layers from a top of the powder bed (which is less than all the layers for a full height build). The set number of layers may be less than 10, less than 100 or less than 1000 layers of the powder bed. At frequencies between 100 MHz to 500 MHz a coil exhibits complex electromagnetic behaviour due to the distributed nature of the magnetic and electrical coupling between turns of the coil. As a result, at these frequencies there are multiple resonant frequencies. The controller may be arranged to control the radio wave generator to operate at a resonant mode higher than the self-resonant mode (R1). It is difficult to tune (impendence match) the self-resonant mode (R1) for both empty and powder-loaded volumes and so there is little power delivery to the powder at this resonant frequency. The controller may be arranged to control the radio wave generator to operate at the next resonant mode (R2) from the self-resonant mode (R1). It has been found that at the next resonant mode, the power can be effectively coupled to the powder to heat the powder using an impedance matching circuit.

According to a second aspect of the invention a powder bed fusion method comprising lowering a build platform in a build sleeve, forming layers of metal powder to form the bed, operating a scanner to direct an energy beam to consolidate the metal powder at selected regions on each layer and heating the powder with a radio-wave generator.

The method may comprise heating the powder within a radio wave resonator that surrounds the metal powder using radio waves at a resonant frequency of the resonator.

The radio wave generator may be controlled to generate frequencies between 100 MHz to 500 MHz. The method may comprise operating the radio wave generator at a resonant frequency above a self-resonant mode of the radio wave resonator. The method may comprise altering the frequency of the generated radio waves to match the resonant frequency to the powder of the bed. The method may comprise sweeping the frequency of the radio waves across a range of frequencies to identify and/or track the resonant frequency. For example, the resonant frequency may change as the build platform is lowered and/or more powder is added to the bed.

DESCRIPTION OF THE DRAWINGS

FIG. 6 shows COMSOL simulations of the magnetic field distribution in a) the first resonant mode R1 at 60 MHz, showing the expected solenoidal field, and b) the second resonant mode R2 at 190 MHz;

FIG. 7 shows the reflection coefficient |S11| measured for an empty coil which has been tuned using the π network shown, and for a coil loaded with a virgin WC powder sample;

DESCRIPTION OF EMBODIMENTS

Figure 1:
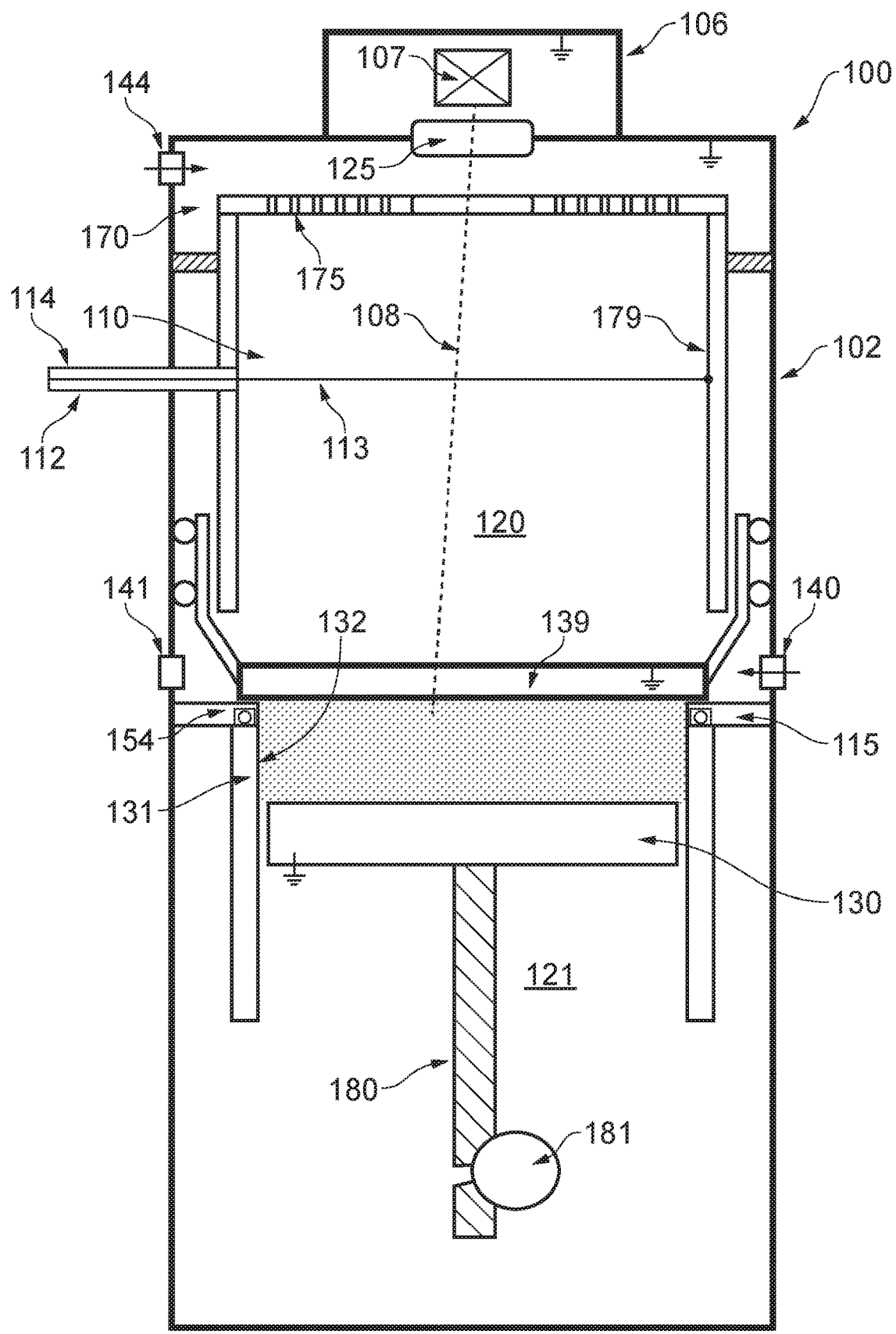
FIG. 1 is a schematic illustration of a powder bed fusion apparatus according to one embodiment of the invention.
Figure 2:
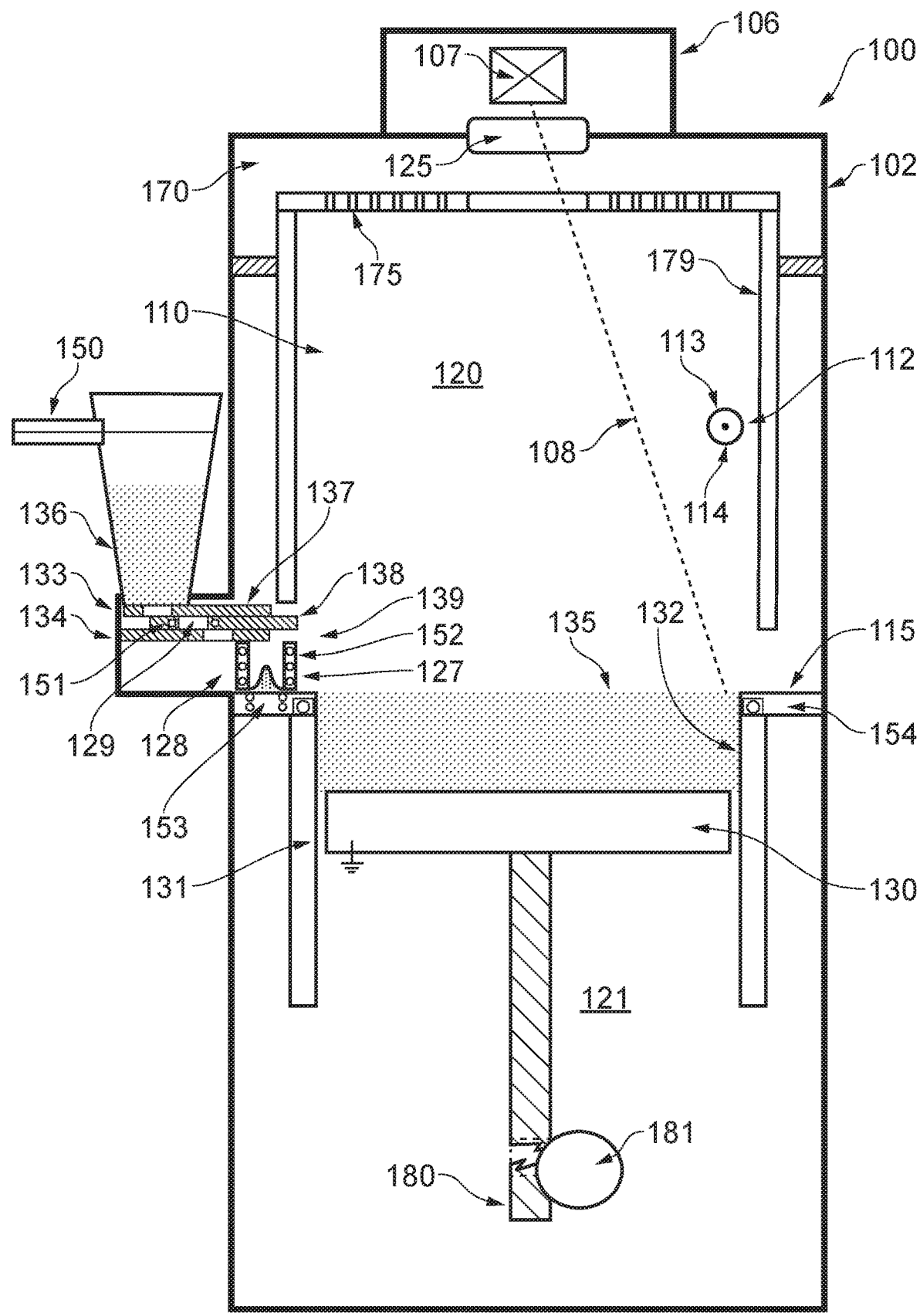
FIG. 2 is a schematic illustration of the powder bed fusion apparatus shown in FIG. 1 viewed from a perpendicular direction.
Figure 3:
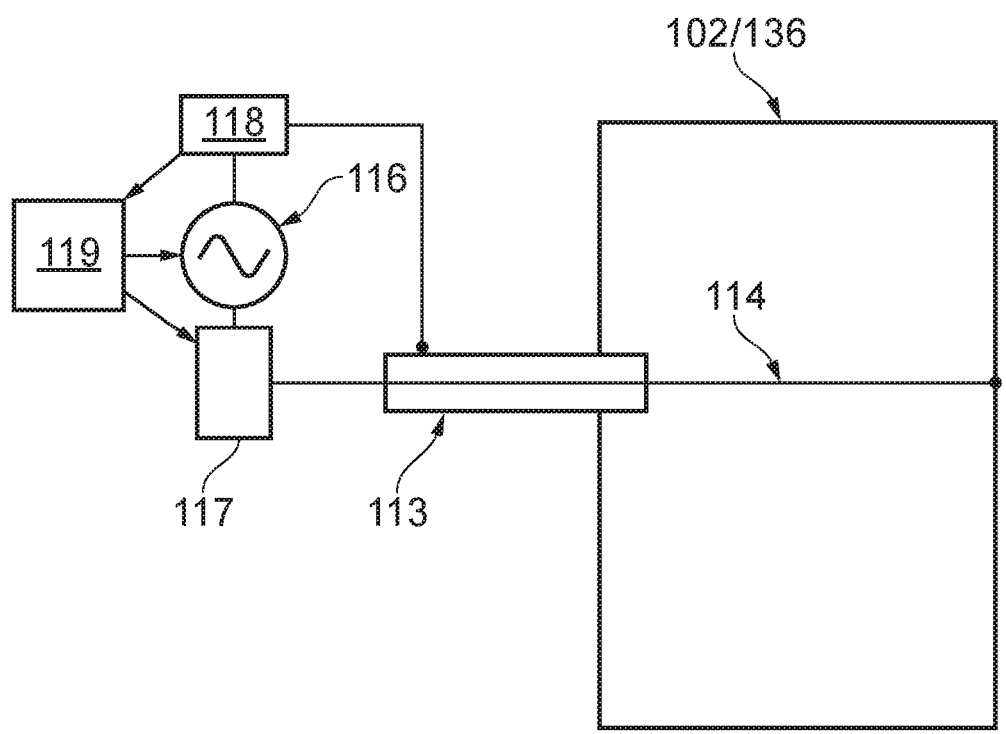
FIG. 3 is a schematic illustration of a circuit of the powder bed fusion apparatus for generating radio waves.

With reference to FIGS. 1 to 3, a powder bed fusion apparatus 100 according to an embodiment of the invention includes a build chamber 102 that can be sealed from the external environment. The build chamber 102 is divided into an upper processing chamber 120 and a lower chamber 121 by processing plate 115 and a build platform 130 reciprocally movable within a bore 132 of a build sleeve 131. The build platform 130 is moved by an elevator mechanism (lead screw 180 and drive mechanism 181) located in the lower chamber 121. The build platform 130 is sealably engaged with the bore 132 of the build sleeve 131 to prevent egress of powder into the lower chamber 121. This is achieved by seals (not shown), associated with an edge of the build platform 130, which physically engage with the bore 132 of the build sleeve 131. The processing plate 115, build sleeve 131, build platform 130 and associated seals function to form a barrier for the powder such that the powder remains in the processing chamber 120 and does not travel to the lower chamber 121.

The apparatus further comprises a hopper 136 for storing metal powder and a dosing mechanism 137 for delivering powder from the hopper 136 into the processing chamber 120. In this embodiment, the dosing mechanism 137 comprises a metering member 138 sandwiched between first and second retaining plates 133, 134 and movable relative thereto. The metering member 138 comprising one or more metering voids 129 therein that extend through the metering member 138, the or each metering void 129 having an entrance opening defined in a first, upper face of the metering member 138 and an exit opening defined in a second, lower face of the metering member 138. Relative movement of the metering member 138 moves the void(s) 129 from a position in which the entrance opening can receive powder from the powder hopper 136 to a position in which powder contained in the metering void(s) 129 exits from the or each void 129 via the exit opening into the processing chamber 120. An example of such a metering member is described in WO2010/007396, which is incorporated herein by reference.

The processing chamber 120 houses a recoater 139 for spreading a layer of powder over the build surface 135 from a location where the powder is dosed by the dosing mechanism 137 across a working plane 135. In this embodiment, the recoater 139 comprises two wipers formed by upstanding walls 127, 128, which define a cavity therebetween into which the powder is dosed. An example of such a wiper is disclosed in U.S. Pat. No. 6,672,343.

Optical access to the processing chamber 120 for one or more high-powered laser beam 108 is provided via window 125. The one or more high-powered laser beams 108 is/are directed by a scanner 106 though the window 125 to the build plane 135 to melt selected regions of successive layers of powder. The scanner 106 comprises titling mirrors 107 controlled by galvanometers (not shown) for directing the laser beam(s) 108 to the required locations on the bed. In one embodiment, the optical module is as described in WO2017/085470, which is incorporated herein by reference.

In use, the build platform 130 is lowered to accommodate the object as it is formed layer by layer. The processing chamber 120 allows control of the atmosphere directly above the build platform 130 and the upper surface of the build platform 130 is subject to the atmosphere of the processing chamber 120 even as the build platform 130 is lowered. The build chamber 102 may be capable of holding a vacuum, for example to at least −950 millibar (relative to atmospheric pressure).

The lower chamber 121 allows the atmosphere below the build platform 130 to be controlled and the lower surface of the build platform 130 is subject to the atmosphere of the lower chamber 121 even as the build platform 130 is lowered.

The upper and lower chambers 120, 121 are coupled to each other via an opening (not shown), which allows the pressure in each chamber to be equalised. This arrangement provides the advantage that the pressure immediately above and below the build platform 130 may be maintained at the same level. The pressure above and below the build platform 130 may be maintained at a vacuum pressure during the build or at a super-atmospheric pressure during the build, such as 10 millibar (relative to atmospheric pressure). Such a super-atmospheric pressure may be achieved by backfilling the build chamber 102 with an inert gas, such as argon or nitrogen, via an inlet (not shown).

The build chamber 102 comprises a gas nozzle aperture 140 and a gas exhaust aperture 141 for generating a gas flow through the processing chamber 120 across the working plane 135. The gas flow acts as a gas knife carrying condensate created by the melting of the powder with the laser beam(s) 108 away from the build area. The apparatus comprises a further gas nozzle 144 for injecting gas into an upper portion of the build chamber 120. A conductive inner structure 179 (hereinafter referred to as an insert) having apertures 175 in an upper region thereof is located in the upper chamber 120 such that the further gas nozzle 144 injects gas into a region 170 between a ceiling of the build chamber 120 and a top of the insert 179. This gas then flows from region 170 down through apertures 175 is form a downward gas flow down from the window 125. This downward gas flow may prevent condensate from rising up to and collecting on the window 125, which in turn could affect the quality of the laser beam(s) 108 delivered through the window 125.

The gas flow circuit for forming the inert atmosphere and the gas knife may be as described in WO2016/079494, which is incorporated herein by reference.

Figure 4:
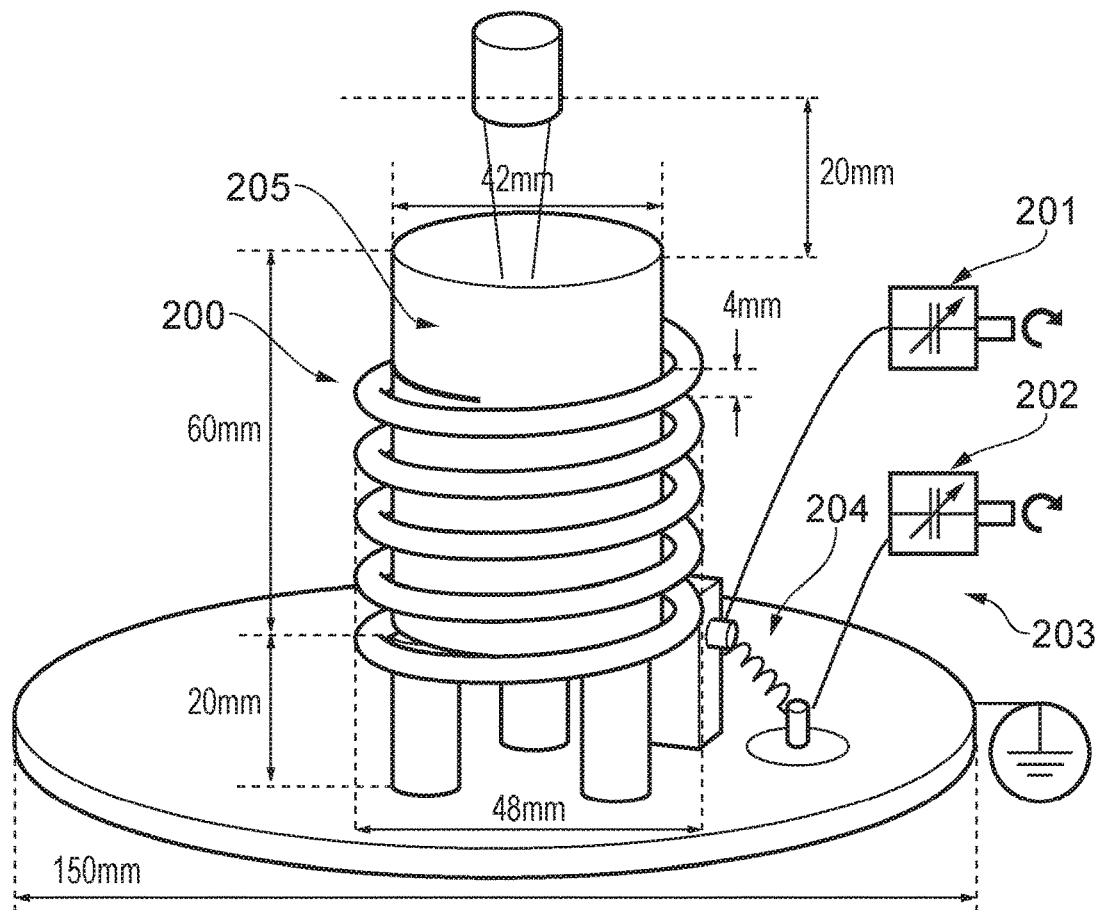
FIG. 4 is a schematic diagram of an experimental set up.

The powder bed fusion apparatus 100 comprises a radio-wave resonator 110 comprising a radio wave cavity formed by the build chamber 102, processing plate 115, build sleeve 131 and build platform 130 surrounding the metal powder of the bed. A radio wave generator for generating radio waves comprises a signal generator 116 for generating signals at a frequency between 100 MHz and 500 MHz and a coupling structure for coupling the signals into the radio wave cavity. In this embodiment, the coupling structure is a coaxial cable 112 having an inner conductor electrically connected to an outer conductor 114 via the conductive insert 179 to form a coupling "loop" within the cavity. In this embodiment, the radio wave generator further comprises an impedance matching circuit 117, such as a π matching network (as shown in FIGS. 4 and 7), a signal analyser 118 and a controller 119. The controller 119 is arranged to control the signal generator 116 and impedance matching circuit 117 in response to signals from the signal analyser 118. The signal analyser 118 is arranged to generate signals, which are sent to the controller 119, indicative of a Q factor of the radio wave cavity. The Q factor may be determined from comparing input and output powers of the coaxial cable 112. The controller 119 is arranged to control the impedance matching circuit 117 to maximise the measured Q factor for a given radio wave frequency, for example by adjusting one or more variable capacitors of the impedance matching circuit 117. The controller 119 is arranged to control the signal generator 116 to sweep the frequency of the generated signals across a range of frequencies to find/track a resonant frequency of the cavity. The sweep of frequencies may be carried out periodically, such as after the build platform 130 has been lowered and/or during or after formation of the powder layer so as to alter the frequency based upon a change in geometry of the radio wave cavity and a change in the load that may change a resonant frequency of the cavity. The change in the resonant frequency as the build progresses may be sufficiently slow that a sweep of signal frequencies can be carried out less often, such as more than every 10, 100 or 1000 layers.

Parts of the apparatus that are made of bulk metal, such as the build chamber 102, build platform 130, processing plate 115, build sleeve 131 and recoater 139 will not be significantly heating by the radio-waves. However, in one embodiment, the build chamber 102, build platform 130, processing plate 115, build sleeve 131 and recoater 139 are connected to ground to eliminate any heating that may occur due to the radio waves. If a viewing window is provided in the build chamber 102, a metal mesh structure may be provided over the viewing window to shield the viewer from the radio waves in the upper build chamber 120.

In use, a user inputs into the controller using an interface (not shown) a type of metal powder that is to be used in the build. The controller may have programmed therein a set frequency about which a resonant frequency occurs for that type of metal powder. At the start of the build, the controller 119 may control the signal generator 116 to sweep the signals across a range of frequencies around this set frequency for the identified metal powder and from feedback from the signal analyser 118, identify the resonant frequency of the cavity. The impedance matching circuit is then controlled to tune the circuit to the load present in the cavity. The power may then be increased to generate radio waves in the cavity that heat the powder in the powder bed. The powder may be heated prior to, during and/or after consolidation of the powder using the laser beams 108. The powder may be heated to above 400° C., above 500° C. and preferably above 700° C. Heating of the powder bed before or whilst the powder is melted may allow lower powered laser(s) to be used and therefore, reduce a magnitude of an energy impulse to which the bed is subjected when powder is melted by the laser beam(s) 108. Heating of the powder bed whilst or after the powder is melted may control (slow) a solidification rate of the melt pool, potentially avoiding solidification cracking, and control a cooling rate of the solidified material, potentially reducing the formation of cracks due to thermal stress.

A potential advantage of the apparatus is that metal parts of the apparatus that it would be undesirable to heat are not heated by the radio waves due to the minimal penetration depth of the radio waves into these parts. Furthermore, if needed, parts can be shielded from being heating by the radio waves by suitable grounding of the components (as described above) and/or shielding. In particular, locating sensitive components outside of the insert 179 may help to shield the sensitive components from the radio waves generated within the volume surrounded by the insert 179. This may be further facilitated by locating a cage around the outside of the insert 179 between the insert 179 and the walls of the build chamber 102.

The powder bed fusion apparatus 100 may comprise further radio wave resonators 150 to 154.

Radio wave resonator 150 (referred to hereinafter as "the hopper radio wave resonator") is similar to radio wave resonator 110 but provided in the hopper with the hopper housing forming the resonant cavity. The hopper radio wave resonator 150 may have a control circuit similar to that shown in FIG. 3. Like the radio wave resonator 110, the hopper radio wave resonator 150 heats the powder using a resonant frequency between 100 MHz to 500 MHz. The hopper radio wave resonator 150 heats powder in the hopper 136 before it is dosed and spread into layers to form the powder bed. A potential advantage of heating powder in the hopper instead of within the build chamber 102 is that it may be easier to avoid unwanted heating of other components, such as components of the optical module 106. However, cooling of the powder can occur between the powder being heated in the hopper 136 and the powder being formed into layers of the bed. The hopper radio wave resonator 150 may be also be used in addition to the radio wave resonator 110.

Radio wave resonator 151 (referred to hereinafter as "the metering radio wave resonator") comprises a coil embedded within or surrounding the metering member 138 and heats the powder contained in the metering void through radio-frequency heating. Like the radio wave resonators 110 and 150, the metering radio wave resonator 151 heats the powder using a resonant frequency between 100 MHz to 500 MHz. As the amount of powder in the void is consistent throughout the build, a frequency of the radio waves may not have to be changed as the build progresses. Walls of the metering member 138 are made of a material that is transparent to radio waves. The metering hopper radio wave resonator 151 may be also be used as an alternative or in addition to the radio wave resonator(s) 110, 150.

Radio wave resonator 152 (referred to hereinafter as "the recoater radio wave resonator") comprises a coil embedded within or surrounding the recoater 139 and heats the powder contained in the recoater through radio-frequency heating. Like the radio wave resonators 110, 150 and 151, the recoater radio wave resonator 152 heats the powder using a resonant frequency between 100 MHz to 500 MHz. As the amount of powder in the recoater before the powder is spread across the bed is substantially consistent throughout the build, a frequency of the radio waves may not have to be changed as the build progresses. Upstanding walls 127, 128 of the recoater 139 are made of a material that is transparent to radio waves. The recoater radio wave resonator 152 may be also be used as an alternative or in addition to the radio wave resonator(s) 110, 150, 151.

Radio wave resonator 153 (referred to hereinafter as "the processing plate radio wave resonator") comprises a coil embedded within or held within a slot in the processing plate 115 so as to surround a region of the processing plate 115 to one side of the powder bed. The processing plate radio wave resonator 153 heats the powder when located on the processing plate 115 through radio-frequency heating before a dose of the powder is spread to form a layer. Like the radio wave resonators 110, 150, 151, 152, the processing plate radio wave resonator 153 heats the powder using a resonant frequency between 100 MHz to 500 MHz. As the amount of dosed powder is consistent throughout the build, a frequency of the radio waves may not have to be changed as the build progresses. The processing plate 115, at least in the region of the coil, is made of a material that is transparent to radio waves. The processing plate radio wave resonator 153 may be also be used as an alternative or in addition to the radio wave resonator(s) 110, 150, 151, 152.

Radio wave resonator 154 (referred to hereinafter as "the powder bed radio wave resonator") comprises a coil embedded within or held within a slot in the processing plate 115 or embedded within or surrounding the build sleeve 131 to surround an upper portion of the powder bed. The powder bed radio wave resonator 154 heats the powder within this upper region of the powder bed through radio-frequency heating. Like the radio wave resonators 110, 150, 151, 152, 153, the powder bed radio wave resonator 154 heats the powder using a resonant frequency between 100 MHz to 500 MHz. As the amount of dosed powder in this upper region of the powder bed is consistent throughout the build, a frequency of the radio waves may not have to be changed as the build progresses. The processing plate 115 or build sleeve 131, at least in the region of the coil, is made of a material that is transparent to radio waves. The powder bed radio wave resonator 154 may be also be used as an alternative or in addition to the radio wave resonator(s) 110, 150, 151, 152, 153.

In all of the embodiments of radio wave resonators 110, and 150 to 154 described above, suitable shielding (not shown), such as a metal cage, may be used to confine the radio waves to a desired region and to increase the Q factor.

Example

Figure 5:
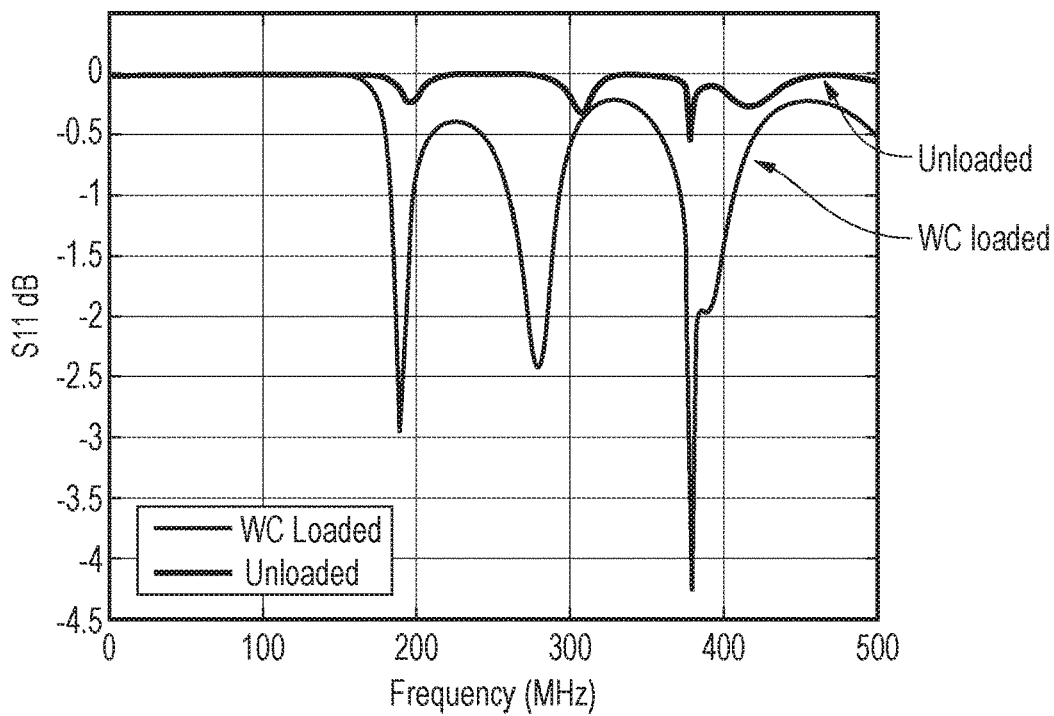
FIG. 5 shows a reflection coefficient |S11| measured for an empty coil and a coil loaded with tungsten carbide (WC) powder.

A helical structure shown in FIG. 4 was used to heat powder at VHF frequencies, in the 100-500 MHz range. The helical structure is a 5-turn coil having a diameter of approximately 50 mm. At VHF, the structure develops a more complex electromagnetic behaviour than that of a common solenoid, due to the distributed nature of the magnetic and electrical coupling between the turns; as such there are multiple resonances (which we denote R1, R2, etc.) as seen in the plot of $|S_{11}|$ in FIG. 5. In free space, the structure also acts as a significant radiator, so to enhance the Q factor the helical structure is enclosed in a "cage" (not shown). Magnetic field $\overline{H}$ uniformity is shown in FIGS. 6a and 6b calculated using COMSOL Multiphysics®. The lowest frequency, self-resonant mode (R1) of the coil occurs at 60 MHz and can be modelled in the traditional way as a parallel RLC tank circuit.

At resonance the input impedance of R1 is both real and very high, representing a near open circuit condition. It is difficult to tune (i.e. impedance match) R1 for both empty and powder-loaded coils and so there is very little power delivery possible to the sample, as is evident from FIG. 5. For this reason, we turn our attention to the next resonant mode R2 at around 190 MHz, which effectively couples RF power to the powder sample and is easily tuned by the variable capacitors 201, 202 shown in FIG. 4.

One potential drawback of the use of R2 is the degradation in the $\overline{H}$ field uniformity, as shown in FIG. 6(b), and the fact that the sample is bathed in both $\overline{E}$ and $\overline{H}$ fields, but effective absorption of the input power by the sample occurs nonetheless. Powdered tungsten carbide (WC) samples are used in the experiments since the various tungsten oxides formed are coloured and so give an indication of the temperatures reached. The electrical conductivity of WC is around $5 \times 10^6$ S/m, giving a maximum magnetic dipole absorption in the VHF frequency range.

Tuning Circuit and Power Transfer to the Sample

The coil 200 comprises 5 turns wound from 4 mm copper tubing. The Coil has an inner diameter of 48 mm and height of 50 mm. Coil tuning was via a π matching network 203 consisting of a fixed series inductor 204 and two variable shunt capacitors 201, 202. The insertion loss at resonance can be tuned to less than −20 dB, meaning that >99% of the input power is coupled to the system. Prior to heating, the sample-loaded is deliberately untuned, such that on heating the Q factor drops (as the conductivity decreases); it then "self-tunes" to achieve closer input impedance matching. At all points in the heating cycle, the tuning can be adjusted manually via the variable RF shunt capacitors.

Unloaded Q factors have been measured at low input power (0 dBm) using a vector network analyser (Agilent E5071C); Q reduces from $Q_O=896\pm1$ when empty to $Q_S=236\pm2$ when an approximate 40 cm³ powder sample of WC contained in a 50 cm³ Pyrex beaker 205 is loaded coaxially into the coil operating in R2 mode. The partition of power dissipated between the coil and sample can be quantified approximately by the heating efficiency factor $\eta=1-Q_S/Q_0$, so for the WC powder around 75% of the input power is dissipated as heat in the sample. A purpose-built, dual directional coupler of directivity 20 dB, with a coupling factor of 62 dB, was incorporated into the experiment to measure input and reflected powers using two USB power meters.

Temperature Measurement

One of the major challenges in RF heating is the measurement of sample temperature. In these experiments, a Micro-epsilon pyrometer was mounted to the top plate of the applicator, directly adjacent to the top surface of the WC powder, for which an emissivity of 0.85 has been assumed. A wide-field view thermal imaging camera was also used to monitor the surface temperature of the overall system. Both of these thermometers measure surface temperature only; the temperature deep within the sample could be much higher. An attractive feature of tungsten is the colour of its oxides, which form on heating it in the air. For example, $WO_3$ is bright green/yellow, and its presence can be used to infer the temperature attained. Another attractive property is that $WO_3$ is thermochromic, meaning that it will exhibit different colours at different temperatures, which also provides an inference of temperature.

Sample Preparation and Measurement Procedure

Three Pyrex beakers were filled with 404±1 g of virgin WC metal powder (supplied by LPW Technology), sealed in an argon atmosphere, with particle sizes in the range 5 μm-25 μm. Each sample-loaded beaker was placed inside an insulating jacket made from 2 mm thick calcium magnesium silicate ($CaMgO_4Si$) and centred coaxially inside the applicator coil. Several tungsten oxides form on heating WC in the air. The final phase is the yellow/green tungsten trioxide ($WO_3$), forming between temperatures of 516-646° C.

The 0 dBm output power of a signal generator is amplified by a power amplifier (of gain 49 dB), operating in continuous wave mode, giving an available power of approximately 75 W after taking into account all system losses. The USB power meters are used to determine the reflection coefficient and hence quantify the efficiency of power delivery to the sample loaded coil during the heating process. A frequency sweep across a bandwidth of 50 MHz allows the system to keep track of the resonant frequency of R2 (at around 190 MHz) and also the quality factor change (for which $\Delta(1/Q)$ quantifies the fractional change in the sample losses, much in the same way as in conventional cavity perturbation theory. When the system is initialized it locks onto the resonance frequency and backs off the input power to measure $|S_{11}|$ Q is extracted by fitting the resonance absorption curve $1-|S_{11}|^2$ in the frequency domain to a Lorentzian response and correcting for the effects of coupling. Power is then switched to its maximum value, after which heating commences. The surface temperature of the beaker is monitored via the pyrometer. Each sample was observed to behave very similarly, requiring re-tuning after an initial self-tuning stage, based on the tuning adjustment described above. Sudden jumps in the temperature for each sample during heating, as measured by the pyrometer, are likely to be indicative of surface oxide formation. After heating for around 20 mins, the RF power is switched off, and each sample is allowed to cool naturally (in air) to ambient temperature.

Heating Profiles and Tungsten Oxide Formation

Figure 8:
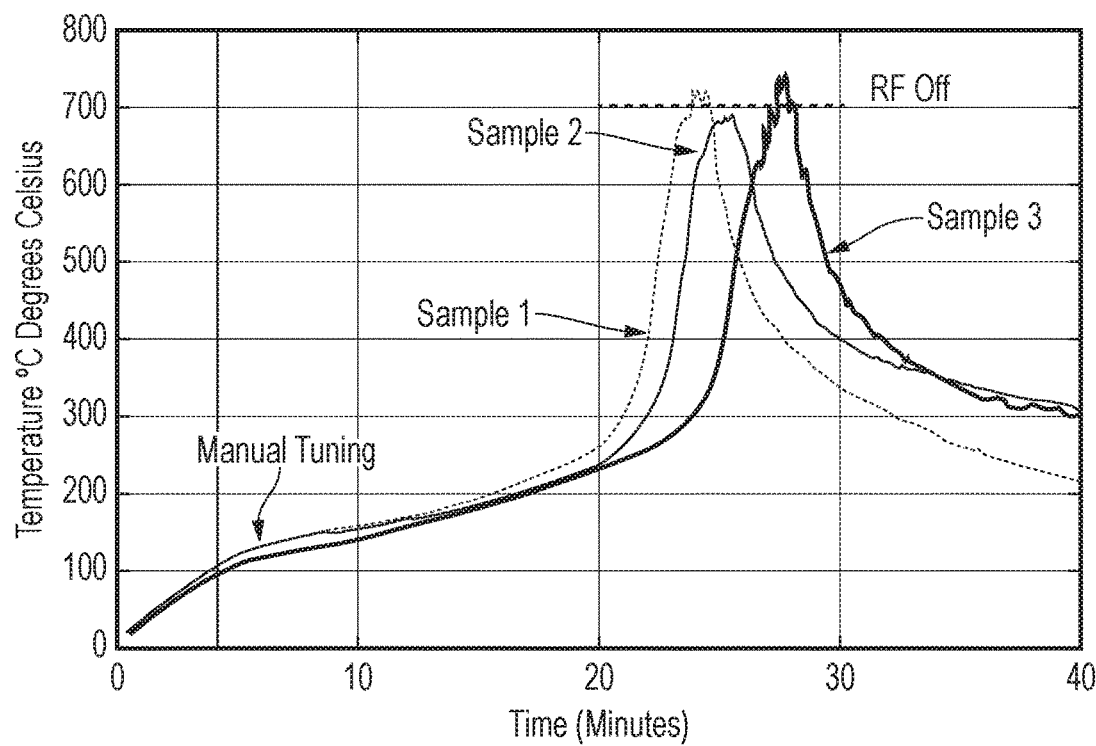
FIG. 8 shows heating profiles of the three tungsten carbide powder samples (When the pyrometer read 700° C. the RF power was switched off, and samples were allowed to cool naturally (in air))
Figure 9:
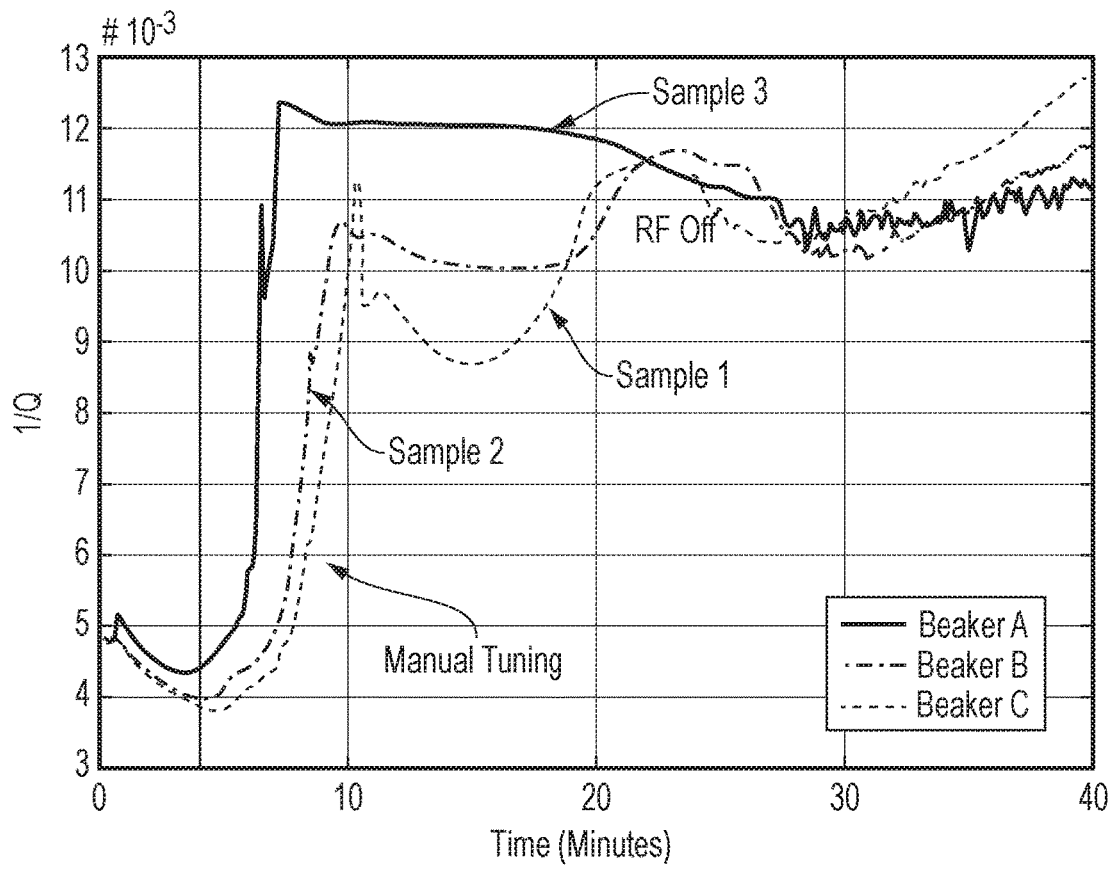
FIG. 9 are Plots of 1/Q during heating for the three WC samples—The reduction in Q on heating is apparent, associated with the reduced electrical conductivity of the powder particles.

Each sample was exposed to the same processing conditions. Each sample exhibited rapid heating during an initial linear stage, over which the system self-tunes. A manual tuning stage is then operated by adjusting the shunt capacitors to maintain good impedance matching, which accounts for the slight variations in the temperature profiles shown in FIG. 8. The RF power was switched off when 700° C. was indicated by the pyrometer. The heating profiles for all three samples exhibit qualitatively similar features. The rate of apparent temperature rise is particularly acute after a heating time of 20 minutes and is likely to be due to the change of emissivity of the top layer of the powder as oxides form, affecting the apparent temperature reading of the pyrometer. The measurement system has the very useful feature of being able to measure Q as the sample heats, as is shown in FIG. 9. Here, changes in 1/Q are plotted, as these relate to changes in resonant bandwidth for R2, and are directly proportional to the power loss in the sample. In addition to providing effective, intense heating of a powder sample, by tracking the Q factor in this way allows the formation of the various oxides to be studied if a flow of oxygen (or air) is passed through the sample during heating.

Figure 10:
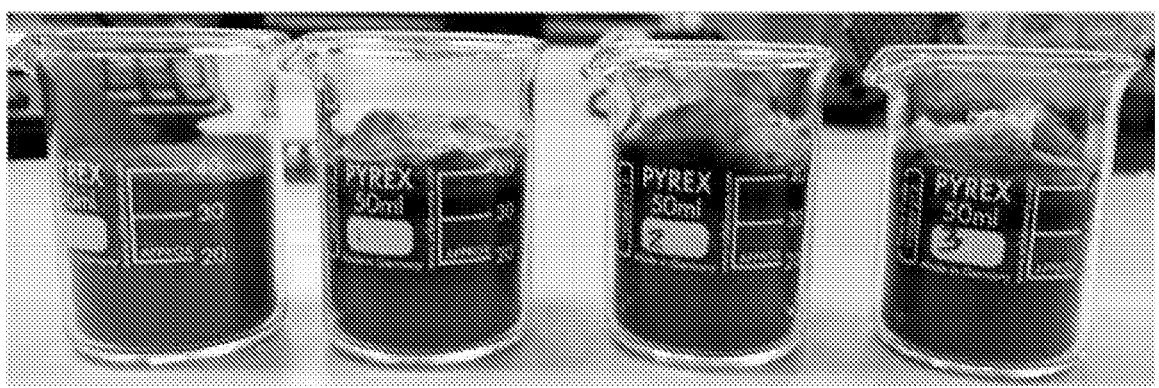
FIG. 10 shows Virgin tungsten carbide sample and Three identical WC samples after heating, exhibiting the bright yellow/green WO3 phase.

A photograph of the three batches of the processed powders is shown in FIG. 10. This clearly shows the $WO_3$ phase in the top layer, and also the grey-blue tungsten oxides formed at intermediate temperatures in the layers immediately below the $WO_3$. No oxide is observed (via colour change) in the bulk of the powder. The virgin powder has air gaps between its powder particles, but on heating, this oxygen is soon used up, and since there is no flow of oxygen through the sample, not enough oxide is formed for any colour change to be seen. The presence of $WO_3$ is itself evidence of a temperature of at least 646° C. on the top surface of the powder, with the likelihood of a much higher temperature having been achieved in the bulk of the powder.

It will be understood that alterations and modifications to the above described embodiments may be made without departing from the invention as defined herein. For example, metal powders other than tungsten carbide may be heated using the radio wave resonator. Other powder dosing mechanisms may be used, such as a dosing piston, and the radio wave resonator may heat the powder in the dosing piston. The outer sheath 114 of the coaxial cable may extend further into the cavity. This may allow the coaxial cable to take a more tortuous route through the build chamber 102 to avoid interference with the operating of the machine without resulting in a highly asymmetric electromagnetic field (for example, the radiative structure may be substantially confined to the insert 179 rather than including the exposed portion of the inner conductor 113). The coaxial cable may be connected with the build chamber 102 itself rather than the insert within the build chamber 102. In such an arrangement, the insert may be made of a material transparent to the radio waves, such as a polymer. Other energy beams, such as electron beams, may be used instead of laser beams. Use of such laser beams may require modification of the operating environment, for example electron beams should be used in a vacuum rather than an inert gas atmosphere, such as argon or nitrogen. In one embodiment, the radio wave generator does not operate at a resonant frequency of the cavity. The above described apparatus may still provide advantages, such as a reduction in complexity, even when not operating at a resonant frequency.

The invention claimed is:

1. A powder bed fusion method comprising
   lowering a build platform in a build sleeve,
   forming layers of metal powder to form a bed,
   operating a scanner to direct an energy beam to consolidate the metal powder at selected regions on each layer and heating the metal powder within a radio wave generator that surrounds the metal powder, heating the metal powder within a radio wave resonator that surrounds the metal powder using radio waves at a resonant frequency of the radio wave resonator, and sweeping a frequency of the radio waves across a range of frequencies to identify and/or track the resonant frequency.

2. A powder bed fusion method according to claim 1, wherein the radio wave generator is controlled to generate resonant frequencies between 100 MHz to 500 MHz.

3. A powder bed fusion method according to claim 1, comprising altering the frequency of the generated radio waves to track changes in the resonant frequency of the radio wave resonator as the bed of metal powder is formed.

4. A powder bed fusion method according to claim 1, comprising setting a frequency of the generated radio waves in response to a signal generated by a sensor.

5. A powder bed fusion method according to claim 1, wherein the radio wave generator comprises a radio-wave cavity containing the metal powder.

6. A powder bed fusion method according to claim 5, wherein walls of the radio-wave cavity are formed by walls of a build chamber, a build sleeve and a build platform of a powder bed fusion apparatus.

7. A powder bed fusion method according to claim 1, wherein the radio wave generator is controlled to generate resonant frequencies between 30 MHz to 500 MHz.

8. A powder bed fusion apparatus comprising
a build platform movable in a build sleeve, the build platform being configured to support a bed of metal powder,
a powder layer formation device configured to form layers of metal powder to form the bed,
a scanner for directing an energy beam to selected regions of each layer to consolidate the metal powder, and
a radio-wave generator arranged to surround the metal powder and generate radio waves to heat the metal powder that forms the bed, wherein
the radio-wave generator comprises a radio-wave resonator that surrounds the metal powder and the radio wave generator is arranged to operate at a resonant frequency of the radio wave resonator when containing a bed of metal powder,
the radio wave generator comprises a signal generator and a controller configured to carry out the powder bed fusion method of claim 1.

9. A powder bed fusion apparatus according to claim 8, wherein the radio-wave generator is arranged to generate radio waves between 30 MHz to 500 MHz.

10. A powder bed fusion apparatus according to claim 8, wherein the controller controls the signal generator to set the frequency of the generated radio waves in response to a signal generated by a sensor.

11. A powder bed fusion apparatus according to claim 8, wherein the radio-wave generator comprises a radio-wave cavity containing the metal powder.

12. A powder bed fusion apparatus according to claim 11, wherein walls of the radio-wave cavity are formed by walls of a build chamber, the build sleeve and build platform.

* * * * *